July 3, 1951 K. A. KNUTSEN Re. 23,385

RECORDING AND CONTROLLING CARD

Original Filed July 7, 1948

INVENTOR
Knut A. Knutsen

By Watson, Cole, Grindle & Watson

Reissued July 3, 1951

Re. 23,385

UNITED STATES PATENT OFFICE 23,385

RECORDING AND CONTROLLING CARD

Knut A. Knutsen, Paris, France, assignor to Compagnie des Machines Bull (Societe Anonyme), Paris, France, a company of France Original No. 2,508,953, dated May 23, 1950, Serial No. 37,412, July 7, 1948. Application for reissue January 19, 1951, Serial No. 206,741. In France October 16, 1947

8 Claims. (Cl. 235—61.12)

Matter enclosed in heavy brackets [ ] appears in the original patent but forms no part of this reissue specification; matter printed in italics indicates the additions made by reissue.

My invention has for its object improvements in recording or controlling cards and it covers more particularly a card subdivided into vertical columns and horizontal lines, each horizontal line relating to a predetermined value while the actual value may be recorded in each column of said card by affixing a sign, a line, a dot, a blot or the like in the column considered on the horizontal line corresponding to the value that is to be recorded.

My invention refers thus more particularly to a card of the well-known type used in perforated card machines with the difference that on such perforated cards, the value is given out by a perforation provided at a predetermined location whereas on a card executed in accordance with my present invention the same value is given out by an opaque sign such as a line, a dot, a blot or the like, affixed on the card at the location considered. These blots or lines termed hereinafter value signs are distinguishable from the body of the card by reason of their opacity, color or of their particular electric properties. Such a card may be read by means of a photo-cell or the like suitable known means.

The card may include furthermore, in addition to the areas where the values are marked as disclosed hereabove, one or more areas adapted to receive perforations as in the case of ordinary perforated cards.

The value signs may be produced by means of electrically conductive ink or the like material whereby the card may also be read through an electric contact between each value sign and one or more sensing members. Cards with such electrically conductive value signs are known per se.

Generally, perforated cards as known heretofore show in each column of the card previously printed digits ranging from 0 to 9, referred to hereinafter as location digits, said digits indicating the location of a perforation that is to correspond to the value of one of said digits.

Generally the perforation of a card is performed by machine and the location digits serve only for the identification through visual reading of the different perforations provided.

When the values are to be shown by blots or the like signs termed value signs, it is generally desirable to affix such signs by hand without resorting to a machine. In this case previously printed location digits or corresponding location signs indicate the accurate location at which the value signs are to be affixed. If these location signs were however printed in a normal manner a drawback may be met inasmuch as when a card is to be read photoelectrically, said previously printed location signs act on the cell and render thus difficult the reading of the value signs.

My invention has for its object a particular form of execution of such location signs, according to which the said signs are constituted by impressions of a nature such that they do not act substantially on the photo-cell or cells or the like arrangements used for the reading of a card.

According to a first form of execution of the invention, these location signs are constituted by recesses formed on the surface of the card and adapted to show where the value signs are to be affixed. These recesses may serve as guides for the pencil, pen or the like means used for drawing such value signs.

The following description given out by way of example and by no means in a binding sense with reference to accompanying drawings will allow ascertaining how the invention may be executed in practice, the features appearing both in the drawing and in the specification forming obviously part of the invention.

In the example described, the figures of the drawings illustrating it are as follows.

Figure 1:
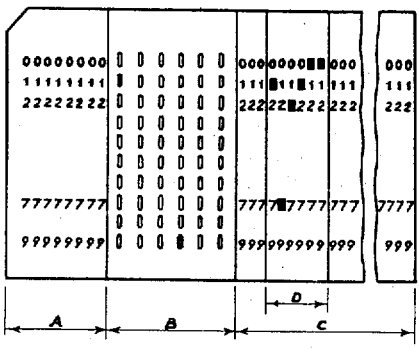
Fig. 1 shows a perforated card including an area provided with vertical location signs according to my invention.

The card shown in Fig. 1 includes two areas A and C wherein the location digits are printed normally as is the case generally for cards used in so-called perforated card machines.

Figure 3:
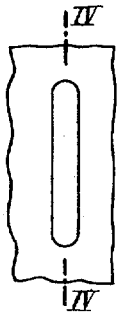
Fig. 3 is a detail of Fig. 1 on an enlarged scale.
Figure 4:
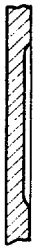
Fig. 4 is a cross-section on an enlarged scale through line IV—IV of Fig. 3.
Figure 5:
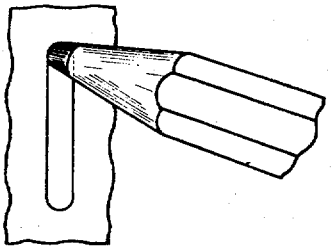
Fig. 5 illustrates the recording of a value sign under the form of a line.

The area D of the card is provided with perforations that through their location and in accordance with the code generally used correspond to the number 172,100. The area B of the card carries no printed matter but shows in each vertical column ten location signs under the form of recesses. The distance between the vertical columns of the zones B may be the same as for the areas A and C or else it may be selected at will. In the case illustrated in Figure 1, the spacing between the vertical columns in the area B is larger than in the case of the spacing of the columns in the zones A and C provided for receiving perforations. One of the impressed recesses is illustrated on a larger scale in Fig. 3. It includes a recess shown cross-sectionally in Fig. 4. Such recesses may be obtained mechanically through the pressure of a tool or otherwise in accordance with any known method that it is not necessary to describe. By reason of their small depth, they do not produce any shadows adapted to have an influence on the reading means. In addition to their use for indicating the location of the actual value sign, such impressions act as guiding means for the pencil, the pen or the like means used for affixing value signs. Fig. 5 shows how such a recess may guide the tip of a pencil used for drawing a line of predetermined length exactly at the location desired.

Figure 2:
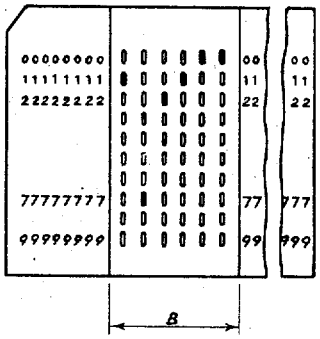
Fig. 2 shows a portion of the card of Fig. 1 carrying spots or lines corresponding to the values.

Fig. 2 shows a card provided in its area B with its lines or signs corresponding to different values according to my method and showing the same number 172,100 as that recorded by perforations in the area D of Fig. 1. The printed location digits to either side of the zone B of Fig. 1 allow finding easily in the area B the impression corresponding to the value that is to be given out.

The reading of the area B is performed for instance by causing the card to pass in front of a system of photo-cells, each cell corresponding to one vertical column and only one. The line affixed in a column distinguishes from the color of the card and produces a modification in the cell current at a precise predetermined moment of the machine cycle. This variation in current is suitably amplified and actuates a relay that in its turn provides a recording of the value considered. This reading and recording form well known operations.

The surface at the bottom of the recesses of the location impressions may be a rough one in order to make the deposition of material easier.

Figure 6:
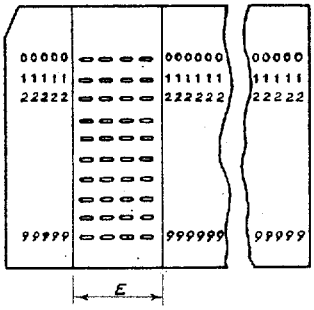
Fig. 6 shows a card including an area provided with horizontal location signs.
Figure 7:
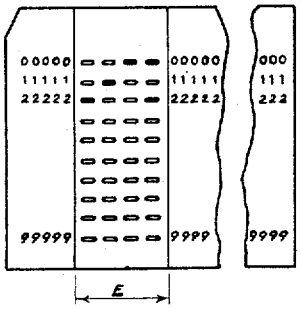
Fig. 7 is a detail of the card illustrated in Fig. 6 said card being provided with lines of a conductive material indicating a value.

Fig. 6 shows a card including an area E provided with location impression assuming a horizontal direction. Fig. 7 shows the area E of the same card wherein four location impressions have been provided with lines made of conductive ink so as to form the number 2,100. As hereinabove the recess of the location impressions serve as guides for a pencil or the like tool providing for one execution of an electrically conductive line, and they allow thus the obtention of an accurately located well-defined line.

When the lines of conductive ink are laid over a smooth card without any recesses, the friction of the cards against one another during the handling, stacking or feeding of the cards one by one from a stack into the machine used for reading the card, provides to a variable extent for the removal of the conductive ink which leads to errors in the recording obtained in the machine.

My invention solves such difficulties. The conductive ink or paste introduced in accordance with my invention inside the recess forming the location impression is better retained and cannot be removed by the rubbing of the cards against one another.

A further advantage of the card provided with recesses according to the invention consists in that it is possible to apply a thicker layer of conductive material on the card for each line, or sign executed, which makes the electric contact a more reliable one.

The cards provided with lines of conductive material may be scanned in any known manner; for instance the card may be caused to advance in front of a series of pairs of contacting members, and when a conductive line passes in front of two such members, said line forms a connection between said two members and closes the circuit to which the said two members belong.

The existence of recessed impressions in the card allows moving nearer to one another the vertical columns in the area of the card ascribed to such impressions, which increases the capacity of the card. As a matter of fact and in the absence of such impressions, when lines or signs are laid in the columns, a line may be more or less shifted toward an adjacent column which will risk thus acting on the cell adapted to read said adjacent column and consequently making errors arise.

Cards provided with hollow location impressions according to my invention show the same advantages as disclosed hereinabove in the case where the material forming the value signs have particular properties other than color or conductivity as already mentioned. For instance, the material may show magnetic properties (atomised iron) or else dielectric or phosphorescent properties. Reading means suiting such various cases are well known per se.

What I claim is:

1. A statistical card for controlling a machine with electrical sensing means, said card having a plurality of index point positions arranged in denominationally ordered columns in which each of said index point positions is delimited by a location sign consisting of a recess [of oblong form] impressed in the front surface of the card, said recess being adapted to receive material physically different from that of the card below the front surface of said card.

2. A statistical card for controlling a machine with electrical sensing means, said card having a plurality of index point positions arranged in denominationally ordered columns in which each of said index point positions is delimited by a location sign consisting of a recess of oblong form impressed in the front surface of the card, and a layer of material physically different from that of the card deposited in at least one of said recesses for acting on the sensing means, said layer having a thickness at most equal to the depth of the recess.

3. A statistical card for controlling a machine with photo-electric sensing means, said card having a plurality of index point positions arranged in denominationally ordered columns in which each of said index point positions is delimited by a location sign consisting of a recess of oblong form impressed in the front surface of the card, said recess being of the same color as the card so that it has no action on the photo-electric sensing means.

4. A statistical card for controlling a machine with photo-electric sensing means, said card having a plurality of index point positions arranged in denominationally ordered columns in which each of said index point positions is delimited by a location sign consisting of a recess of oblong form impressed in the front surface of the card, said recess being of the same color as the card so that it has no action on the photo-electric sensing means and a layer of material having a color different from that of the card deposited in at least one of said recesses, the thickness of said layer being at most equal to the depth of the recess.

5. A statistical card for controlling a machine with means for sensing electrically conductive marks, said card having a plurality of index point positions arranged in denominationally ordered columns in which each of said index point positions is delimited by a recess of oblong form impressed in the front surface of the card, said recess being adapted to receive conductive material below the front surface of said card.

6. A statistical card for controlling a machine with means for sensing electrically conductive marks, said card having a plurality of index point positions arranged in denominationally ordered columns in which each of said index point positions is delimited by a recess of oblong form impressed in the front surface of the card and a layer of conductive material deposited in at least one of said recesses the thickness of said layer being at most equal to the depth of the recess.

7. A statistical card for controlling a machine with photo-electric sensing means, said card having a plurality of index point positions arranged in denominationally ordered columns in which the location of each index point position is delimited by a recess of oblong form impressed in the front surface of the card, said recess being of the same color as the card and having edges to guide and limit the movement of an instrument for depositing colored material in said recess.

8. A statistical card for controlling a machine with means for sensing electrically conductive marks, said card having a plurality of index point positions arranged in denominationally ordered columns in which each of said index point positions is delimited by a recess of oblong form impressed in the front surface of the card, said recess having edges adapted to guide in orthogonal directions an instrument for depositing conductive material in said recess.

KNUT A. KNUTSEN.

REFERENCES CITED

The following references are of record in the file of this patent or the original patent:

UNITED STATES PATENTS

| Number | Name | Date |
|---|---|---|
| 1,962,732 | Bryce et al. | June 12, 1934 |
| 2,150,256 | Warren | Mar. 14, 1939 |
| 2,275,396 | Johnson | Mar. 3, 1942 |
| 2,310,438 | Johnson | Feb. 9, 1943 |